July 5, 1955     M. DEKER ET AL     2,712,312
TREATED FABRIC

Filed Oct. 13, 1951     2 Sheets-Sheet 1

INVENTORS:
MARTA DEKER
OLIVER S. PLANTINGA
BY
John W. Brumbaugh
ATTORNEY

July 5, 1955  M. DEKER ET AL  2,712,312
TREATED FABRIC

Filed Oct. 13, 1951  2 Sheets-Sheet 2

INVENTORS:
MARTA DEKER
OLIVER S. PLANTINGA
BY
John W. Brumbaugh
ATTORNEY

United States Patent Office 2,712,312
Patented July 5, 1955

2,712,312

TREATED FABRIC

Marta Deker, New Brunswick, and Oliver S. Plantinga, East Brunswick Township, Middlesex County, N. J., assignors to Johnson & Johnson, a corporation of New Jersey Application October 13, 1951, Serial No. 251,232

9 Claims. (Cl. 128—156)

This invention relates to improved impregnated fabrics and, in particular, to improved crinoline-type materials prepared by impregnating gauze with suitable sizing compositions.

In the manufacture of crinoline, which is commonly used as protective strip for adhesive bandages and other surgical dressings, a woven gauze is impregnated with a sizing composition comprising an aqueous dispersion of a modified (e. g. dextrinized) starch. The impregnated gauze is dried and the formed crinoline wound on a roll preparatory to further treatment such as slitting and packaging. In subsequent processing, for example in the manufacture of surgical dressings, the crinoline is often heat-sterilized. This sterilization may be effected by maintaining the surgical dressing, e. g. adhesive bandage containing overlapped portions of protective crinoline, in a pressure vessel, introducing open "live" steam into the vessel and maintaining pressure therein for time sufficient to effect sterilization. It had been found in the past that because of certain properties inherent in the crinoline, the heat-sterilization procedure caused the contiguous layers of crinoline to fuse together, thereby rendering stripping of the protective crinoline quite difficult and enhancing the possibility of contaminating by finger contact the portions of the bandage and dressing desired to be maintained in a sterile condition. Solution of this problem has been complicated by the requirement that any agent added to the crinoline to render it more resistant to heat sterilization must be compatible with both the plaster mass and the gauze pad of the adhesive bandage and, further, must not produce "tendering," i. e. weakening, of the crinoline, which is likely to occur at the relatively elevated temperature to which the gauze is subjected after impregnation with the sizing composition.

A particularly important object of the present invention is to develop a fabric containing modified starch as impregnant, which fabric possess unusual refractory properties and, in particular, is not susceptible to sticking between layers when subjected to heat sterilization.

According to the present invention it has been found that fabrics containing as impregnant modified starch and aluminum salt in amount corresponding to at least about 0.25% by weight (based on said starch) of aluminum possess unusual properties in resisting tendency toward fusion of layers encountered in ordinary impregnated fabrics. Preferred embodiments of the invention are directed to particular amounts and types of aluminum salt, particular amounts of modified starch in the fabric, and controlling the acidity of the treated fabric, as will be further explained hereinafter. By the method herein described, refractory properties may be imparted to modified starch-impregnated fabrics while still maintaining compatibility between the impregnated material and e. g. the dressing or adhesive mass of an adhesive bandage, or other material with which the treated fabric comes into contact.

An embodiment of the invention directed to an adhesive bandage, having as facing material crinoline prepared according to the invention, is illustrated in the attached drawings.

Figure 1:
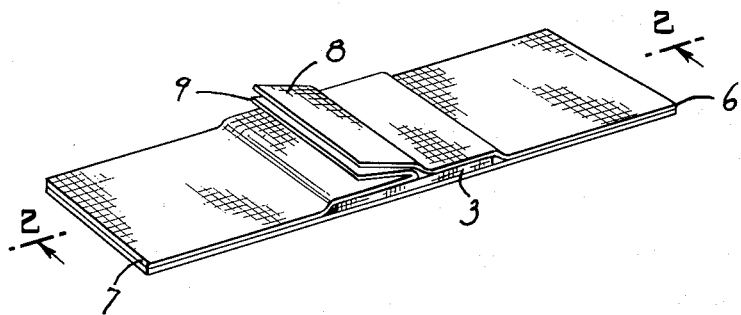
Fig. 1 is an isometric view of an adhesive bandage as seen from above.
Figure 2:
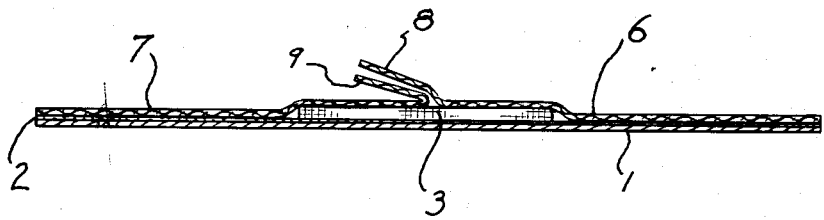
Fig. 2 is a longitudinal section taken along plane 2—2 of Fig. 1.

Reference number 1 designates an adhesive bandage backing which may be of suitable material coated on the top surface with adhesive mass 2. Gauze pad 3, which is of conventional form, is disposed on and secured by adhesive mass 2. Crinoline strips 6 and 7 cover exposed portions of adhesive mass 2 and further overlap above gauze pad 3 as shown. The shape and disposition of facing strips 6 and 7 is conventional and well-known in the art.

According to the invention, the facing strips 6 and 7 are formed of crinoline made with starch and water-soluble aluminum salt, as indicated above and described in greater detail below. The advantage of the invention is realized in that overlapping portions 8 and 9, by reason of the treatment described herein, resist tendency to become stuck together during steam sterilization.

Figure 3:
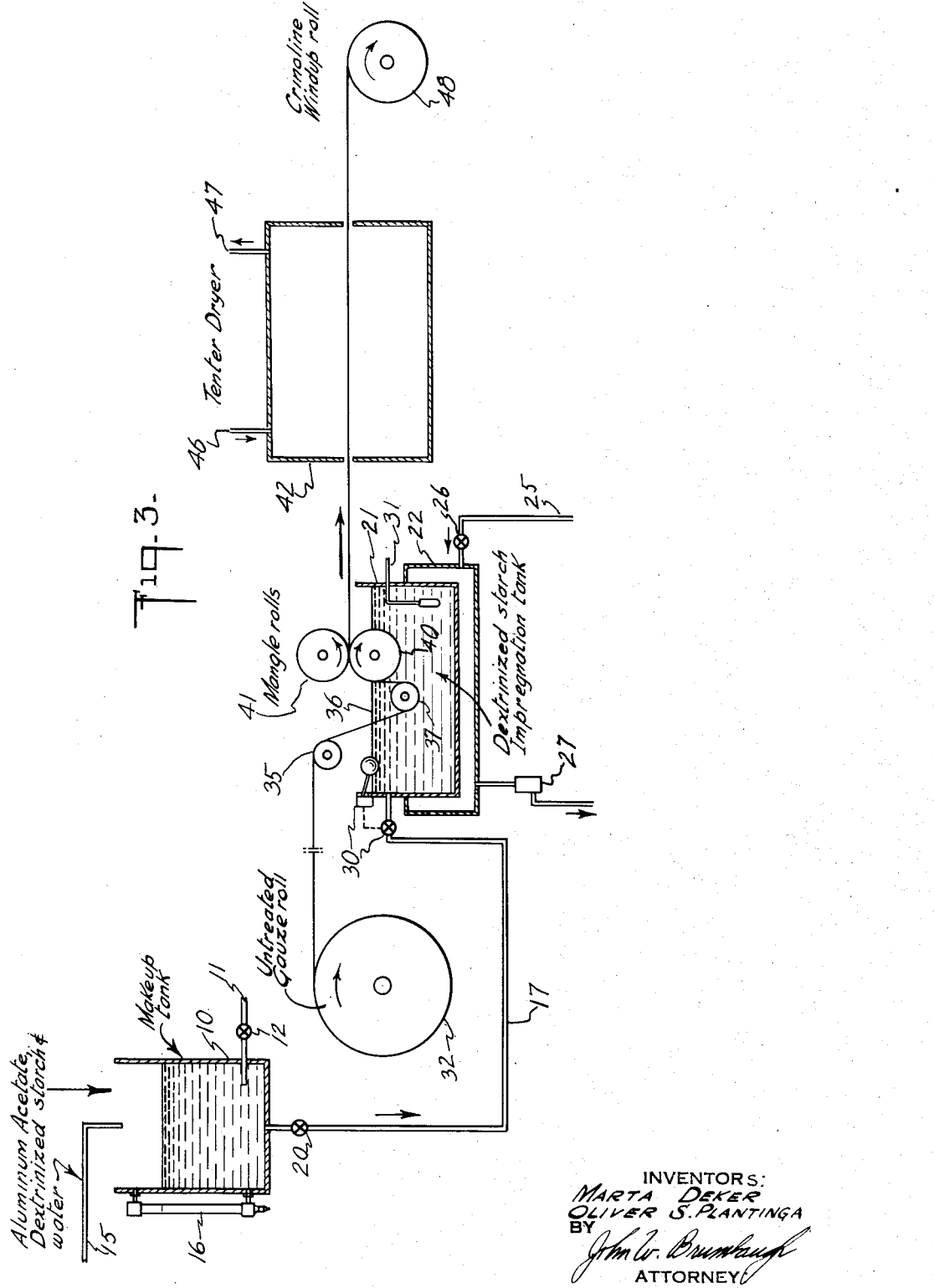
Fig. 3 is a schematic flow diagram of the operation.

The process of manufacture of improved impregnated fabrics may be conveniently understood by reference to Fig. 3 of the attached drawing. Reference No. 10 designates a make-up tank which is employed for mixing the modized starch, aluminum salt such as aluminum acetate, and water in the desired proportions and heating the mixture. Water is added to tank 10 through pipe 15 in desired amount as indicated on sight glass 16. Aluminum salt such as aluminum acetate, and modified starch may then be added directly at the top of the tank, and "live" steam introduced into the mixture through pipe 11 and valve 12 to raise its temperature to the desired level, as discussed more fully below, and effect solution or dispersion of the solids in the water. The mixture is also stored at elevated temperature in this tank for time sufficient to carry the starch through and beyond a stage of maximum viscosity, as will be further explained herein.

The size composition is withdrawn from tank 10 via pipe 17 by opening valve 20, the composition passing into impregnation tank 21. Tank 21 is provided with suitable steam jacket 22, fed with steam through pipe 25 and valve 26 and purged of condensate by trap 27. Float-type automatic level control means 30 affords rate of feed of size composition from tank 10 to tank 21 to maintain a relatively constant level of size in tank 21. Temperature measuring means such as thermometer 31, which is preferably connected with a suitable recording device, may be provided. Untreated gauze from roll 32 is passed over guide roll 35 in the dry condition and thence enters sizing bath 36 in tank 21. The gauze passes beneath lower guide roll 37, over the leading face of lower mangle roll 40, and thereafter between the upper mangle roll 41 and lower roll 40. The upper roll 41 is preferably formed with a periphery of rubber or other resilient material, the lower roll 40 of steel, and the two rolls are forced together by means not shown in the drawing so as to control the pick-up of size composition carried by the gauze into drier 42. The chamber in drier 42 is preferably heated by hot air entering through duct 46 and leaving through duct 47. If desired, it may be supplied with suitable "tentering" clips mounted on two horizontal chains disposed at opposite edges of the gauze web, which chains move continuously with the web and grasp the edges of the web to maintain desired width of the gauze during the drying operation. The sized and dried gauze, which is now designated as crinoline, is wound up on roll 48 preparatory to further processing steps such as slitting in narrow widths.

Aluminum acetate is a preferred aluminum salt employed as treating agent in the products and processes of this invention. However, the invention is not limited to this particular salt. Aluminum sulphate is a suitable material. Aluminum chloride is an example of another salt suitable for the purpose of the present invention. Broadly considered, therefore, the invention comprises the use of any soluble salt of aluminum. This is distinguished from the numerous insoluble forms of aluminum such as the various clays, the oxide and the hydrate, which latter materials would act merely as fillers and would not produce the beneficial refractory characteristics realized when the soluble aluminum salts are utilized.

The aluminum salt is employed in amounts sufficient to impart to the modified starch refractory properties to the degree desired. The optimum concentration may vary to some extent depending upon the particular aluminum salt and the particular modified starch. However, generally, appreciable effect of the aluminum salt may be noted when it is present in amount corresponding with at least about 0.25% aluminum by weight (based on the modified starch). No particular deleterious effect is produced by maintaining high concentrations of aluminum salt, but, in general, above about 2.5% aluminum by weight (based on the modified starch) the increase in beneficial effect obtained by adding additional aluminum salt is substantially less. The ultimate impregnated fabric also contains approximately 0.25 to 2.5% by weight of aluminum (present in the form of the salt) based on the modified starch. Aluminum salt concentrations, particularly in the case of aluminum acetate, in both sized and dried product and sizing composition lie in the approximate range of 0.4 to 2.0% aluminum by weight of the modified starch.

The modified starch employed for fabric impregnation according to this invention may be any of the materials formed by treating ordinary starch, such as corn starch or potato starch, to make a "thin boiling" product. The materials are variously called "converted" starches, "dextrinized" starches, or "degenerated" starches. Enzymes or acids may be used as catalysts, frequently at elevated temperatures, to produce these modified starches. Chemical agents such as oxygen or chlorine are sometimes employed. The object of modifying the starch is to render the material more water-soluble to produce dispersions having lower viscosity, which effects are probably brought about by reducing the length of the starch molecules. The degree of modification of the starch may be determined as follows. An aqueous dispersion of modified starch at room temperature and 30% by weight concentration is placed in a Brabender Viscograph Amylograph supplied with a standard spring, and heated therein so as to increase the liquid temperature at the rate of 1.5° C. per minute until a temperature of 92.5° C. is reached. Thereafter it is permitted to cool to a temperature of 82° C. (180° F.) at the rate of 1.5° C. per minute and held at 180° F. for 30 minutes. If the viscosity reading on the Viscograph is then found to be 500 or less, the original modified starch will be suitable for fabric impregnation according to this invention. Preferably the viscosity of the modified starch measured as above should be about 300 or below.

Depending upon the degree of stiffness and perhaps other characteristics to be imparted to the fabric, the latter will contain modified starch in the approximate range 10 to 200% by weight, based on the dry fabric. Preferred amounts of modified starch particularly suitable for crinoline manufacture lie in the approximate range 40 to 90% by weight. To obtain the desired pick-up of modified starch in the size composition by the fabric, the weight concentration of starch in the dispersion may be maintained in the range 15 to 50% by weight. Preferably 25 to 40% by weight concentrations are maintained since these values afford certain advantages from the standpoint of facility and flexibility of operation in producing preferred sized fabrics.

The pH of the size composition is a factor to be controlled in producing an impregnated fabric having optimum properties. To prevent "tendering" or incipient weakening of the fibers of the fabric, particularly during the drying operation, the pH of the size is maintained above about 3.5, preferably above about 4.0. High pH's, on the other hand, are avoided in order to maintain the aluminum in active salt form and prevent its precipitation in the form of the oxide or hydrate. For the latter purpose, the pH of the size is maintained not greater than about 6.8. The pH of the size is reflected in the pH of the produced dried fabric, and the preferred range of pH of the fabric is approximately the same as indicated for the size composition. The fabric pH may be determined by known means, such as dropping suitable indicators on the dried material and noting color change or soaking the fabric in a small amount of distilled water and measuring the pH of the mixture by a meter. Control of pH is particularly important when employing, for example, aluminum sulphate or other acid salt as treating agent. The pH may be brought within the desired range by adding any neutralizing agent such as an alkali to the size. Similarly, if the size composition is found to be excessively alkaline, caused for example by the presence of alkalies in the starch, appropriate amounts of acidic material such as acetic or phosphoric acid may be incorporated in the size in order to adjust the pH to the preferred range.

After forming the size composition in make-up tank 10 by the procedure heretofore described, the size is maintained therein at temperature sufficiently elevated and for time sufficiently long to bring about stabilization of the viscosity characteristics of the starch. According to recognized theory, when aqueous starch mixtures are heated, the starch molecules become dispersed to form a colloidal system. This phenomenon is accompanied by increase in viscosity. After a period of time at elevated temperature the viscosity decreases to some extent and becomes relatively stable. It is endeavored to produce the latter stabilized condition of the modified starch in make-up tank 10 before feeding the size to impregnation tank 21. Ordinarily, retaining the size in tank 10 for at least 15 minutes at a temperature of about 190° F. will bring about the viscosity stabilization. In impregnation tank 21 the temperature of the sizing bath 36 is maintained at the desired levels by means of steam jacket 22. The temperature should be maintained high enough to keep the size in the fluid state (above about 100° F., preferably above 120° F.) and low enough to avoid excessive evaporation of water (below about 190° F., preferably below about 150° F.).

The conditions maintained for the drying operation are such as will effect removal of water at maximum rate without discoloring or otherwise injuring the fabric. With hot air drying, elevated air temperatures such as 250–300° F. are preferred. The speed of travel of fabric through the drier, temperature and other conditions for drying are controlled to reduce the moisture in the fabric to about 5–10% by weight. If desired, the fabric may even be dried at room temperature provided sufficient time is allowed. Radiant heating provides a suitable drying method.

Following is an example of manufacture of impregnated fabric according to one embodiment of the invention.

Ten pounds of soluble basic aluminum acetate having empirical formula $Al(OH)(C_2H_3O_2)_2$ manufactured by Niacet Chemicals Division, United States Vanadium Corporation and designated as "Niaproof" aluminum acetate powder, 200 pounds of modified starch and 59 gallons of water were placed in make-up tank 10 and steam introduced through pipe 11 until complete dispersion of the solid ingredients in the water had occurred and the temperature of the composition had increased to 90° C. (194° F.). The modified starch was an acid hydrolyzed material manufactured by Stein-Hall Company known as "Texcote-6." The pH of the composition was about 5.0. Heating was continued in tank 10 for about ½ hour at 90° C., at which time sizing composition was allowed to pass through pipe 17 to impregnation tank 21. The temperature of bath 36 was maintained at about 70° C. by means of steam heated jacket 22. The gauze to be treated, stored in roll 32, had a 44-36 thread count and was in the form of a 40 inch wide continuous web. Gauze withdrawn from roll 32 and in a dry condition was passed over rollers 35 and 39 between mangle rolls 40 and 41 maintained at 1½ tons pressure and thereafter passed through tenter drier 42. Drying was carried out at 240-280° F. for time sufficient to reduce the moisture content to about 5%. The finished crinoline wound on roll 48 contained 41% modified starch based on the dry gauze and 0.83% aluminum based on the modified starch. The crinoline was slit into ¾ inch and 1 inch widths and used for overlapping protective strips in the manufacture of adhesive bandages. Sterilization of these adhesive bandages was carried out in the presence of saturated open or "live" steam at 240° F. and 10 p. s. i. gauge for 20 minutes while the adjacent bandages, which were wrapped separately in glassine paper, were held firmly together. After sterilization, twenty of the ¾ inch adhesive bandages selected at random from the lot sterilized were opened. The overlapping tabs of protective crinoline were found to be completely free of sticking. Of twenty 1 inch adhesive bandages selected at random, thirteen were found to have no sticking and seven only slight sticking. Twenty adhesive bandages made with ordinary modified starch, untreated with aluminum salt, and sterilized at the same time and in the same manner as the above aluminum acetate treated crinoline, were all found to stick.

The invention claimed is:

1. A medical product comprising a supported adhesive layer and covering said layer a fabric impregnated with a modified starch and a water soluble aluminum salt in amount corresponding with approximately 0.25 to 2.5% aluminum by weight based on said modified starch.

2. A medical product comprising a supported adhesive layer, and covering said layer a fabric impregnated with about 10 to 200% of a modified starch based on the weight of fabric and a water soluble aluminum salt in amount corresponding with approximately 0.25 to 2.5% aluminum by weight based on said modified starch.

3. A medical product comprising a supported adhesive layer and covering said layer a fabric impregnated with about 10 to 200% of a modified starch based on the weight of fabric and a water soluble aluminum salt in amount corresponding with approximately 0.4 to 2.0% aluminum by weight based on said modified starch.

4. A surgical dressing comprising an absorbent pad and in contact with said pad a covering layer of a fabric containing a modified starch and a water soluble aluminum salt in amount corresponding with approximately 0.25 to 2.5% aluminum by weight based on said modified starch.

5. A surgical dressing comprising an absorbent pad and in contact with said pad a covering layer of a fabric impregnated with about 40 to 90% of a modified starch based on the weight of fabric and a water soluble aluminum salt in amount corresponding with approximately 0.4 to 2.0% aluminum by weight based on said modified starch.

6. A surgical dressing comprising an absorbent pad and in contact with said pad a covering layer of a fabric impregnated with about 40 to 90% of a modified starch based on the weight of fabric and aluminum acetate in amount corresponding with approximately 0.4 to 2.0% aluminum by weight based on said modified starch, said fabric having pH below about 6.8 and not less than 3.5.

7. A surgical dressing comprising a supported adhesive layer and an absorbent pad, overlapped layers of crinoline covering said pad and at least portions of said adhesive layer, said layers of crinoline being adjacent each other in the region of overlapping, said crinoline containing as an impregnant a modified starch and a water soluble aluminum salt in amount corresponding with approximately 0.25 to 2.5% aluminum by weight based on said modified starch.

8. A surgical dressing comprising a supported adhesive layer and an absorbent pad secured to said layer, overlapped layers of gauze crinoline covering said pad and at least portions of said adhesive layer, said layers of crinoline being adjacent each other in the region of overlapping, said crinoline containing as an impregnant about 10 to 200% by weight of the gauze in said crinoline of a modified starch, and aluminum acetate in amount corresponding with approximately 0.4 to 2.0% aluminum by weight based on said modified starch.

9. A heat sterilized surgical dressing comprising a supported adhesive layer and an absorbent pad secured to said layer, overlapped layers of gauze crinoline covering said pad and at least portions of said adhesive layer, said layers of crinoline being adjacent each other in the region of overlapping, said crinoline containing as an impregnant about 40 to 90% by weight of the gauze in said crinoline of a modified starch, and aluminum acetate in amount corresponding with approximately 0.4 to 2.0% aluminum by weight based on said modified starch, said crinoline having pH below about 6.8 and not less than 3.5.

References Cited in the file of this patent

UNITED STATES PATENTS

| Number | Name | Date |
|---|---|---|
| 1,633,213 | King | June 21, 1927 |
| 2,199,363 | Musher | Apr. 30, 1940 |
| 2,346,674 | Goepfert | Apr. 18, 1944 |
| 2,563,661 | Rood | Aug. 7, 1951 |
| 2,565,686 | Hill | Aug. 28, 1951 |